US012601658B2

(12) United States Patent
Gilbertson et al.

(10) Patent No.: US 12,601,658 B2
(45) Date of Patent: Apr. 14, 2026

(54) DETERMINING THE CONDITION OF MOVING PARTS OF AIRCRAFT

(71) Applicant: The Boeing Company, Arlington, VA (US)

(72) Inventors: Daniel David Gilbertson, Florissant, MO (US); John Lyle Vian, Renton, WA (US)

(73) Assignee: THE BOEING COMPANY, Arlington, VA (US)

( * ) Notice: Subject to any disclaimer, the term of this patent is extended or adjusted under 35 U.S.C. 154(b) by 389 days.

(21) Appl. No.: 18/329,154

(22) Filed: Jun. 5, 2023

(65) Prior Publication Data

US 2024/0402053 A1     Dec. 5, 2024

(51) Int. Cl.
*G01M 99/00* (2011.01)

(52) U.S. Cl.
CPC ................................. *G01M 99/005* (2013.01)

(58) Field of Classification Search
CPC .. G01M 99/005; G01M 99/00; G01M 5/0033; G01M 5/005; G01M 5/0066; G01M 5/0075; G01M 5/0091; G01M 5/0016; G01M 5/00; B64D 45/00; B64D 2045/0085; B64D 2045/008; B64D 2045/005; B64F 5/60; B64F 5/00
See application file for complete search history.

(56) References Cited

U.S. PATENT DOCUMENTS

| | | | |
|---|---|---|---|
| 7,400,943 B2 | 7/2008 | Vian et al. | |
| 8,106,753 B2 | 1/2012 | Vian et al. | |
| 8,392,045 B2 | 3/2013 | Vian et al. | |
| 8,437,904 B2 | 5/2013 | Mansouri et al. | |
| 10,124,893 B1 * | 11/2018 | Aalund | G07C 5/006 |
| 10,810,501 B1 * | 10/2020 | Kimchi | G08G 5/57 |
| 12,033,445 B1 * | 7/2024 | Mishra | G07C 5/0816 |
| 2018/0273208 A1 * | 9/2018 | Ismail | B64F 5/60 |
| 2020/0167640 A1 * | 5/2020 | Sundareswara | G06N 3/08 |
| 2022/0185499 A1 | 6/2022 | Jones et al. | |
| 2022/0228946 A1 | 7/2022 | Olbrich et al. | |

OTHER PUBLICATIONS

Extended European Search Report issued Jun. 28, 2024 in corresponding EP Application No. 24158426.7, 7 pages.

* cited by examiner

*Primary Examiner* — Mohamed Charioui
(74) *Attorney, Agent, or Firm* — MH2 Technology Law Group LLP

(57) ABSTRACT

Techniques for assessing an operational condition of an uncrewed air transport platform are presented. The techniques include: arranging the uncrewed air transport platform and at least one external sensor in proximity to each other, where the at least one external sensor includes a vibration sensor; executing a sequence of operations of the uncrewed air transport platform; acquiring sensor data of the uncrewed air transport platform from the at least one external sensor; automatically analyzing the sensor data to detect at least one non-normal health signature of the uncrewed air transport platform; automatically diagnosing one or more degradation condition in the uncrewed air transport platform based on the at least one non-normal health signature; and providing an indication of the one or more degradation condition.

20 Claims, 3 Drawing Sheets

ARRANGE AIRCRAFT AND EXTERNAL SENSORS — 302

EXECUTE SEQUENCE OF OPERATIONS — 304

ACQUIRE SENSOR DATA — 306

ANALYZE SENSOR DATA — 308

DETECT NON-NORMAL SIGNATURE — 310

DIAGNOSE DEGRADATION CONDITION — 312

PROVIDE INDICATION OF DEGRADATION CONDITION — 314

DETERMINE MISSION READINESS — 316

PROVIDE INDICATION OF MISSION READINESS — 318

STORE DATA — 320

300

DETERMINING THE CONDITION OF MOVING PARTS OF AIRCRAFT

FIELD

This disclosure relates generally to assessing the condition of aircraft and their parts.

BACKGROUND

Existing techniques for assessing mission readiness of aircraft lack the ability to efficiently support realistic operational use of uncrewed aircraft such as autonomous and semi-autonomous drones. Existing techniques to assess piloted aircraft for deployment involve integrated test equipment and sensors with a large logistic footprint, e.g., that take up more space, weight, and power than are desired in a highly resource constrained environment. Further, existing techniques used for piloted aircraft are time consuming, labor intensive, and rely on human expertise.

SUMMARY

According to various embodiments, a method of assessing an operational condition of an uncrewed air transport platform is presented. The method includes: arranging the uncrewed air transport platform and at least one external sensor in proximity to each other, wherein the at least one external sensor comprises a vibration sensor; executing a sequence of operations of the uncrewed air transport platform; acquiring sensor data of the uncrewed air transport platform from the at least one external sensor; automatically analyzing the sensor data to detect at least one non-normal health signature of the uncrewed air transport platform; automatically diagnosing one or more degradation condition in the uncrewed air transport platform based on the at least one non-normal health signature; and providing an indication of the one or more degradation condition.

Various optional features of the above embodiments include the following. The vibration sensor may include a stand-off vibration sensor. The uncrewed air transport platform may include at least one internal sensor that is electrically unconnected to any uncrewed air transport platform system, and the method may include acquiring internal sensor data from the internal sensor, where the sensor data includes the internal sensor data. The acquiring the internal sensor data from the internal sensor may include: electrically connecting a wireless transceiver to the internal sensor; and wirelessly acquiring the internal sensor data. The indication of the degradation condition may include an indication of a fault, and the method may include remediating the fault based on the indication of the fault. The indication of the degradation condition may include an indication of a potential future fault, and the method may include performing conditional maintenance on the aircraft based on the indication of the potential future fault. The method may include directing the at least one external sensor to the uncrewed air transport platform to sense at an indicated location on the uncrewed air transport platform. The method may include providing a fiducial marker of the indicated location on an image of the uncrewed air transport platform. The sequence of operations may include an activation of an actuator, where the sensor data comprises actuator data of the actuator, and wherein the at least one non-normal health signature comprises an indication of a degradation condition of the actuator. The automatically analyzing the sensor data may include providing the sensor data to a trained machine learning system.

According to various embodiments, a non-transitory computer readable medium is presented. The computer readable medium includes computer readable instructions that, when executed by an electronic processor, configure the electronic processor to assess an operational condition of an uncrewed air transport platform by performing actions comprising: acquiring sensor data of the uncrewed air transport platform from the at least one external sensor, wherein the sensor data is obtained while executing a sequence of operations of the uncrewed air transport platform after arranging the uncrewed air transport platform and at least one external sensor in proximity to each other, wherein the at least one external sensor comprises a vibration sensor; automatically analyzing the sensor data to detect at least one non-normal health signature of the uncrewed air transport platform; automatically diagnosing one or more degradation condition in the uncrewed air transport platform based on the at least one non-normal health signature; and providing an indication of the one or more degradation condition.

Various optional features of the above embodiments include the following. The vibration sensor may include a stand-off vibration sensor. The uncrewed air transport platform may include at least one internal sensor that is electrically unconnected to any uncrewed air transport platform system, wherein the actions further comprise acquiring internal sensor data from the internal sensor, wherein the sensor data comprises the internal sensor data. The indication of the degradation condition may include an indication of a fault. The indication of the degradation condition may include an indication of a potential future fault. The actions may include directing that the at least one external sensor to the uncrewed air transport platform sense at an indicated location on the uncrewed air transport platform. The sequence of operations may include an activation of an actuator, wherein the sensor data comprises actuator data of the actuator, and wherein the at least one non-normal health signature comprises an indication of a degradation condition of the actuator. The automatically analyzing the sensor data may include providing the sensor data to a trained machine learning system.

According to various embodiments, a system for assessing an operational condition of an uncrewed air transport platform is presented. The system includes: at least one external sensor configured to be arranged in proximity to the uncrewed air transport platform, wherein the at least one external sensor comprises a vibration sensor; and an electronic processor communicatively coupled to the at least one external sensor, the electronic processor configured to perform actions comprising: acquiring sensor data of the uncrewed air transport platform from the at least one external sensor while the uncrewed air transport platform executed a sequence of operations; automatically analyzing the sensor data to detect at least one non-normal health signature of the uncrewed air transport platform; automatically diagnosing one or more degradation condition in the uncrewed air transport platform based on the at least one non-normal health signature; and providing an indication of the one or more degradation condition.

Various optional features of the above embodiments include the following. The vibration sensor may include a stand-off vibration sensor.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Figure 1:
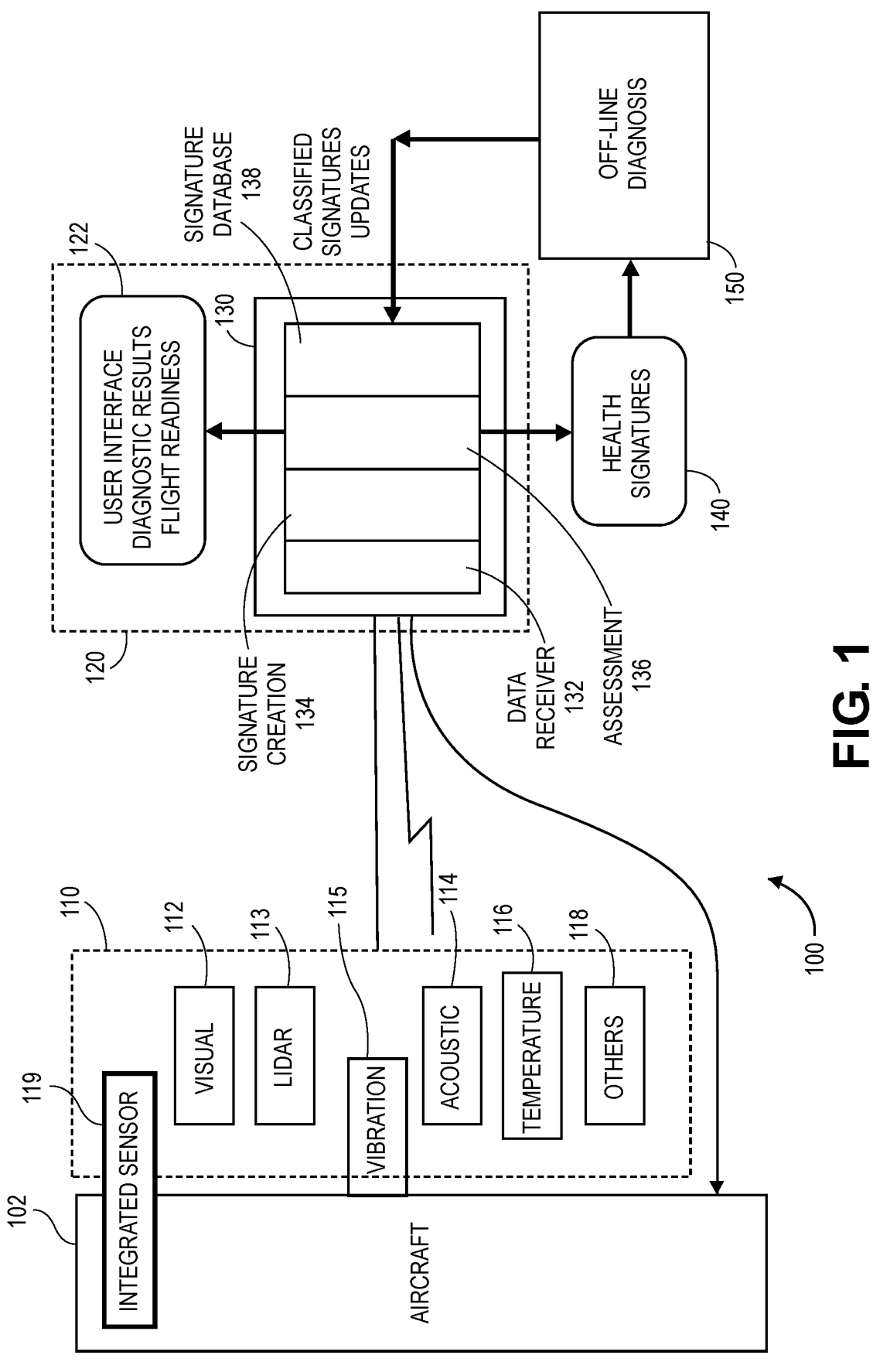
FIG. 1 illustrates a system for assessing mission readiness of an uncrewed air transport platform according to various embodiments.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Uncrewed aircraft would benefit from the ability to rapidly check airworthiness, check systems' health, configure, and launch. Some embodiments provide a system that uses non-intrusive, lightweight sensors to efficiently provide high-fidelity data in furtherance of analysis techniques that are able to rapidly gauge aircraft readiness for deployment. Some embodiments create and compare vehicle health signatures to that of known degradation conditions, and identify faults and/or potential future faults, e.g., relative to fleet-wide characteristics.

Some embodiments provide a process for reliably yet inexpensively assessing the condition of uncrewed aircraft and their parts, particularly their motors and moving parts, through the use of sensors, such that health signatures are created and compared against those of known degradation conditions to identify degradation conditions in the analyzed uncrewed aircraft. The degradation conditions include not only existing faults, but also potential future faults. Detected faults and future faults can thus be used to perform condition-based maintenance. In general, condition based maintenance may utilize gray-scale health indicators to monitor degradation conditions that can be used for maintenance, mission, and logistics planning. Thus, condition based maintenance may be used to avoid failures or be ready to fix them in an efficient manner.

Some embodiments provide for continuous improvement, as the algorithms are updated after non-normal health signatures are diagnosed and added to known degradation condition data sets. According to some embodiments, the algorithms are updated via machine learning after non-normal health signatures are diagnosed, to supplement or reinforce the database of fleet-wide known faults and other degradation conditions and, in turn, provide more reliable predictions about the health and condition of aircraft and their parts.

According to some embodiments, one or more sensors, each of which senses an aspect of the aircraft, are deployed. The sensor(s) may be separate from or integrated with the aircraft. Sensors that are separate from the aircraft may be deployed so as to either be in physical contact with the aircraft, or nearby but not in physical contact with the aircraft. Such sensors that are nearby but not in physical contact with the aircraft may be referred to as "standoff" sensors. Sensors that are integrated with the aircraft may be electrically unconnected to any internal aircraft systems. The sensors may be used while the aircraft is on the ground and undergoing a routine readiness assessment. The sensors transmit their data, via a wireless or wired connection, to a data receiver contained within a user station, the user station being either stationary or portable. From this data, one or more vehicle health signatures are produced. Each health signature can include time-series data and/or features extracted from that data. The health signatures may be classified—e.g., using Fast Fourier Transforms (FFTs) and/or other signal processing methods, neural networks, and/or machine learning methods—to indicate normal conditions, known degradation conditions (e.g., known faults and/or known prognostics indicative of future faults) and anomalous unknown conditions.

The ability to determine the condition of parts such as aircraft propulsion motors and surface actuators can be used to classify not just their current health, and, accordingly, provide some at least some data as to the condition of the aircraft, but also to indicate degradation trends and provide insight for prognostic maintenance and design maturation efforts. Some embodiments also provide added peace of mind that an aircraft can be safely ready to operate without having to do a spot assessment of its health/condition, as that already will have been performed in the normal course.

Some embodiments are particularly advantageous for uncrewed aircraft that seek to achieve high levels of safety assurance and mission effectiveness while retaining operational efficiency at scale (e.g., quantity and tempo of aircraft deployment). Typically, uncrewed aircraft do not require the same level of safety assurances as crewed aircraft, due, for example, to the latter having people aboard. Moreover, uncrewed aircraft typically have lower levels of Size Weight and Power (SWaP) parameters in comparison to crewed aircraft. Therefore, the sensors and associated diagnostic equipment that is typically integrated into crewed aircraft may neither be needed nor possible in uncrewed aircraft. Further, sensor systems that are completely integrated into crewed aircraft that can determine the health of the aircraft can add an undesired cost if incorporated into uncrewed aircraft. Embodiments may utilize sensors that are external to an aircraft and/or sensors that are integrated with the aircraft but electrically unconnected to any internal aircraft systems. Accordingly, embodiments may provide safety assurances to uncrewed aircraft without increasing, or without significantly increasing—e.g., beyond the weight of one or more optional integrated sensors and their wiring to an external attachment point—the SWaP requirements of the aircraft. Embodiments thereby allow for rapid deployment of uncrewed aircraft, unhindered by a restrictive logistic footprint and human involvement.

These and other features and advantages are shown and described herein in reference to the figures.

FIG. 1 illustrates a system 100 for assessing mission readiness of an aircraft, such as an uncrewed air transport platform, according to various embodiments. The system 100 includes one or more sensors 110, which may acquire data from an aircraft 102. The system 100 also includes a user station 120, which may be either stationary or portable and, in both cases, include various systems 130 that acquire and analyze data from the sensors 110, as well as a user interface 122. The system 100 further includes a store of non-normal health signatures 140 and an offline diagnosis system 150. The user station 120 may be implemented using a portable computer, for example, such as a laptop or tablet computer. These and other features of the system 100 are described in detail presently.

The aircraft 102 may be any type of air transport platform, and may be crewed or uncrewed. For example, the aircraft may be a Collaborative Combat Aircraft (CCA) according to some embodiments. The aircraft 102 may be capable of carrying cargo and/or individuals. The aircraft 102 may be fixed wing or rotary wing. The aircraft 102 may be powered by fuel, electricity, or a combination. The aircraft 102 may include one, or a plurality, of engines or motors. Further, the aircraft 102 may include one or more moving parts, in addition to one or more engines or motors. For example, the aircraft 102 may include one or more actuators, such as linear actuators, which may control various systems such as flaps.

The sensors 110 may be fixed or portable and may include one or more of any of a variety of sensor types. The sensors 110 may be integrated into a single apparatus or may be separately arranged.

The sensors 110 may include a visual sensor 112, which may include a digital camera, e.g., including a charged coupled device. Such a sensor can detect various externally visible motions, such as flap or other surface motion.

The sensors 110 may include a temperature sensor 116. The temperature sensor 116 may include a thermal (e.g., infrared) camera, which may provide temperature data at various locations on the aircraft 102.

The sensors 110 may include one or more types of sensors that can detect vibration. For example, the sensors 110 may include a contact vibration sensor 115. The contact vibration sensor 115 may be any type of contact vibration sensor, such as an accelerometer or piezoelectric sensor. The sensors 110 may include a stand-off vibration sensor, which may be implemented as a light detection and ranging (LiDAR) sensor 113 and/or an acoustic sensor 114, by way of non-limiting embodiment. The acoustic sensor 114 may include a microphone, for example. The sensors that can detect vibration may be configured to detect vibration at specific locations on the aircraft 102. The sensors that can detect vibration can perform high frequency, e.g., in the kilo-Hz to mega-Hz range, vibration monitoring on aircraft to get detailed insight into the functioning of motors and moving part systems.

Any of the sensors 110 may include a phased array of sensors. By way of non-limiting example, any of the sensors 115, 113, 114 that may be used to detect vibration may include a phased array. For a phased array of sensors, spread spectrum of time delays may be used to determine the source of the vibration, for example, on or within the aircraft 102.

The sensors 110 may include one or more other sensors 118, not limited to those explicitly listed herein. The sensors 110 may include multiple sensors for each sensor type. For example, the sensors 110 may include multiple contact vibration sensors 115 and/or multiple stand-off vibration sensors 113, 114. Each of the multiple vibration sensors (e.g., 113, 114, 115) may be directed to the same or a different location on the aircraft 102.

According to some embodiments, the sensors 110 may include one or more sensors 119 that are integrated with the aircraft 102. The integrated sensor(s) 119 may be any of the types recited above, including, but not limited to, one or more: visual sensor, temperature sensor, and/or vibration sensor (e.g., a contact vibration sensor and/or a stand-off vibration sensor). Further, the integrated sensor 119 may include a current sensor. The current sensor may sense current on motor power supplies, which provides a signal that indicates how much power is being required for a particular motion of the aircraft or an aircraft part. The integrated sensor 119 may be physically integrated with the aircraft 102, but may be electrically isolated from the aircraft 102. For example, the integrated sensor may be integrated at a location within or on the aircraft 102 so that it is able to obtain sensor data from the aircraft 102, but may not be electrically connected to any electrical system within the aircraft 102. The integrated sensor may add only minor weight to the aircraft, namely the weight of the sensor, wire, and a connector for electrically connecting the integrated sensor 119 to the user station 120 or to a wireless transceiver for communication with the user station 120.

In general, the user station 120 is communicatively coupled to the sensors 110 through the data receiver 132 in any of a variety of ways. For example, the user station 120 may be electrically coupled to the sensors 110 and/or wirelessly coupled to the sensors 110. According to various embodiments, one or more sensors may be electrically coupled to the user station 120, while one or more other sensors may be wirelessly coupled. According to some embodiments, the sensors 110 may communicate, e.g., high-bandwidth raw data via wired connection, and communicate preprocessed (e.g., compressed or Fourier transformed, such as fast Fourier transformed) data via wireless transmission. Thus, the data receiver 132 may include one or more electrical couplings, such as sockets, and/or one or more wireless couplings, such as antennae. For embodiments that include an integrated sensor 119, such a sensor may be communicatively coupled to the user station 120 by wireline or wirelessly. For the latter, a wireless battery-powered transceiver may be electrically coupled to the integrated sensor 119 and communicate the sensor data to the user station 120 wirelessly.

The health signature creation system 134 accepts sensor data and provides one or more corresponding health signatures. Each health signature may include time series data from one or more sensors, and/or one or more features extracted from the time series data. Such features may be extracted using a neural network, a transform such as a Fast Fourier Transform (FFT) or wavelet transform, signal processing, or another extraction technique. Health signatures may include fused data from multiple sensors, according to some embodiments. For example, sensed current may be fused with sensed vibration. Such fused data may be correlated prior to conversion of the fused data into a health signature.

The health signature database 138 stores examples of health signatures, e.g., non-normal health signatures. The stored non-normal health signatures may represent degradation conditions. The non-normal health signatures may be stored in the health signature database 138 in association with identifications of corresponding degradation conditions that give rise to the non-normal health signatures. The health signature database 138 may obtain the identifications of the degradation conditions from the offline diagnosis system 150.

The degradation conditions corresponding to the health signatures stored in the health signature database 138 include both faults and potential future faults. Degradation conditions for which non-normal health signatures are stored include, by way of non-limiting example: degraded actuators, degraded environmental controls, degraded engines, degraded electric motors (e.g., electric propulsive motors), degraded power units, degraded switching values, etc. Any of the degradation conditions may include existing faults or predictions of potential future faults, e.g., degradation conditions that correspond to future component failures. Such predictions of potential faults may include predicted failures of any of the following systems: actuators, environmental controls, engines, electric motors (e.g., electric propulsive motors), power units, switching valves, etc.

For assessing grey scale health, the health signature database 138 may store multiple health signatures for the same degradation condition, in various states of degradation. For example, the health signature database 138 may store multiple health signatures corresponding to a plurality of degradation conditions between 0% failed to 100% failed, thereby providing a grey scale health indicator. For example, the health signature database 138 may store images of tire tread depth, from brand new tires, to tires that are out of specification and due for change. As another example, the health signature database 138 may store fast Fourier transform of sensed vibration, movement, visual, or other data of an exercised actuator, motor, or engine. The fast Fourier transformed data may be in the time domain, with one or more peaks at one or more frequencies. As the components wear, the peaks generally correspond to lower and lower frequencies. Accordingly, health signatures for peaks corresponding to various frequencies may be stored in association with their respective degradation conditions. Alternately, or in addition, a health signature that indicates a range of locations of a peak frequency may be stored in association with one or more thresholds corresponding to peak locations indicative of component health, e.g., from no degradation to complete failure, or from 0% to 100%. In general, a spectrum of health signatures for a corresponding spectrum of degradation conditions for a given component may be stored in the health signature database 138. Such health signatures may be used to predict the remaining useful life of a component. This provides the ability to, for example, assess whether there enough remaining useful life of the component before maintenance for a planned mission.

The health signatures may be stored in compressed format according to some embodiments. The health signature database may be present at the user station 120, or may be remotely stored and accessible by the user station 120 according to some embodiments.

In general, the offline diagnosis system 150 classifies health signatures 140 using signal processing, neural networks, and other machine learning methods to identify normal conditions, known degradation conditions (e.g., known faults and/or potential future faults), and anomalous unknown conditions.

The assessment system 136 compares health signatures of the aircraft 102 produced by the health signature creation system 134 to non-normal health signatures stored in the health signature database 130 in order to determine whether the produced health signature is non-normal, thereby indicating a degradation condition that may impact safety or mission effectiveness. The assessment may utilize any of a variety of assessment techniques. The assessment technique may be based on matching, comparing (e.g., to one or more thresholds), evaluation (e.g., by a trained neural network or other machine learning technique), or a different assessment technique.

As an example assessment technique, the assessment may indicate the presence, absence, or degree of an engine unbalance condition. For this type of assessment, the sensed data may include raw vibrational data for a specified engine rotational frequency, which may be provided by vibration sensors. The health signature may be derived from the raw vibrational data by passing it to a fast Fourier transform, which converts the raw vibration data from the time domain to the frequency domain. The assessment may include passing the health signature to a trained neural network, which outputs an indication of an amount of degradation condition (e.g., from none to complete failure, or from 0% to 100%). Alternately, the raw vibration data may transformed into a different basis function space, such as wavelets to produce feature vectors, which are then passed to the trained neural network to obtain an indication of an amount of degradation condition (e.g., from none to complete failure, or from 0% to 100%). Alternately, the raw vibrational data may be input directly to the trained neural network to obtain an indication of an amount of degradation condition (e.g., from none to complete failure, or from 0% to 100%). In general, the assessment of the degradation condition may include fan unbalance and angular location data, low pressure turbine (LPT) unbalance and angular location data, and/or other diagnostic information.

The user interface 122 includes a display that provides relevant data to a user of the system 100. For example, the user interface may display an indication of whether a health signature of the aircraft 102 is non-normal, and if so, it may display an identification of the corresponding degradation condition. The user interface 122 may further display in indication of mission readiness based on the presence and nature of any identified degradation condition.

The system 100 may be continuously updated as follows. After a health signature is created by the health signature creation system 134, the assessment system 136 may match the created health signature to a non-normal health signature and corresponding degradation condition as stored in the health signature database 130. Alternately, the created health signature may be passed to the offline diagnosis system 150, which processes the created health signature to determine whether it represents anomalous operation and if so, associates it with a diagnosed degradation condition. In either case, the created health signature is associated with a degradation condition. Accordingly, the created health signature may be added to the health signature database 130 in association with the degradation condition. Thus, the health signature database may be updated as the system 100 is used and new health signatures are created. According to some embodiments, all of the health signature databases 130 from among a plurality of copies of the system 100 are updated as new health signatures and corresponding degradation conditions are added to any of them. Accordingly, the system 100 is continuously improved as the health signature database 130 is updated with information gathered from many aircraft, even an entire fleet of aircraft.

Figure 2:
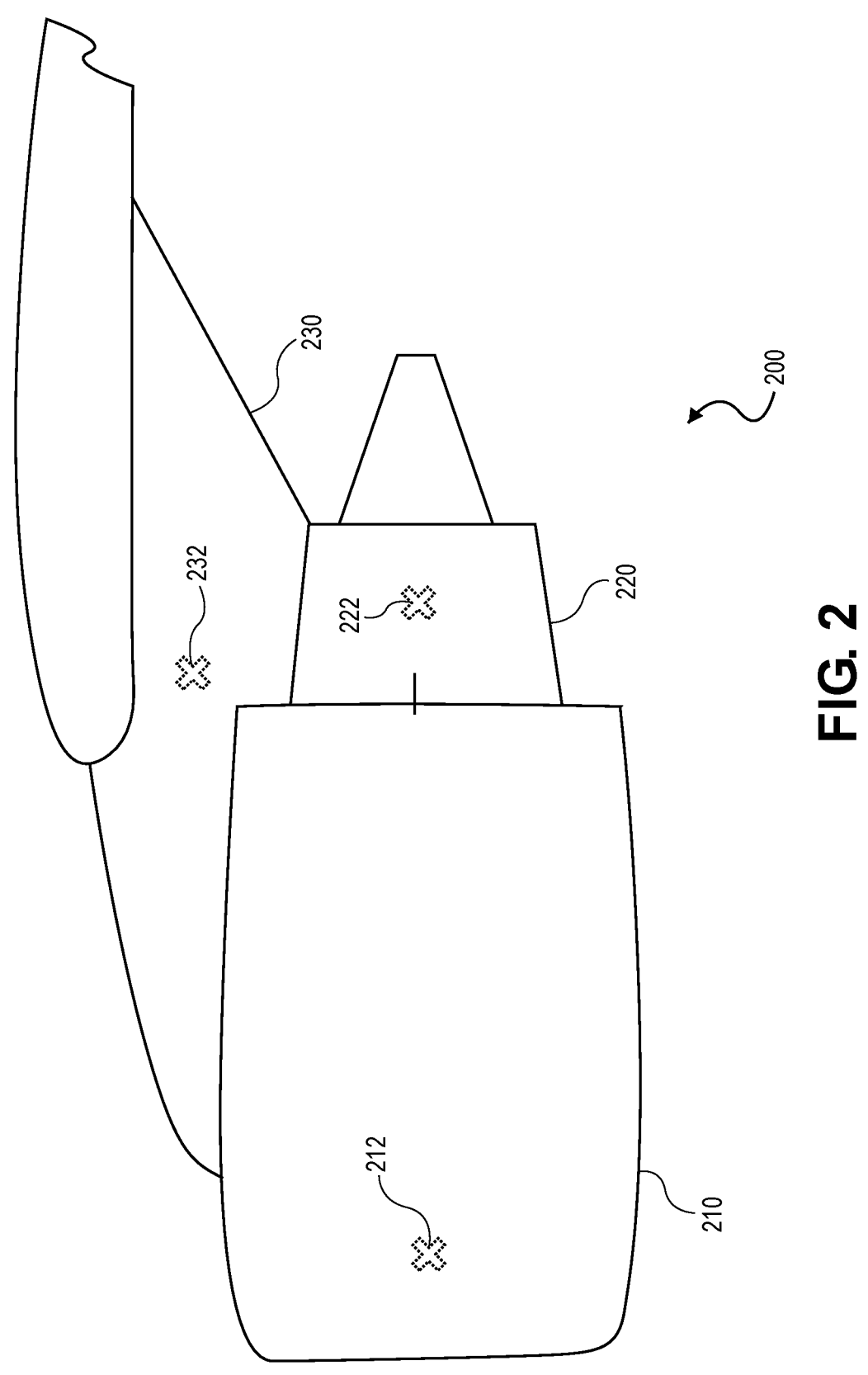
FIG. 2 illustrates an example technique for arranging an uncrewed air transport platform in proximity to sensors according to various embodiments.
Figure 3:
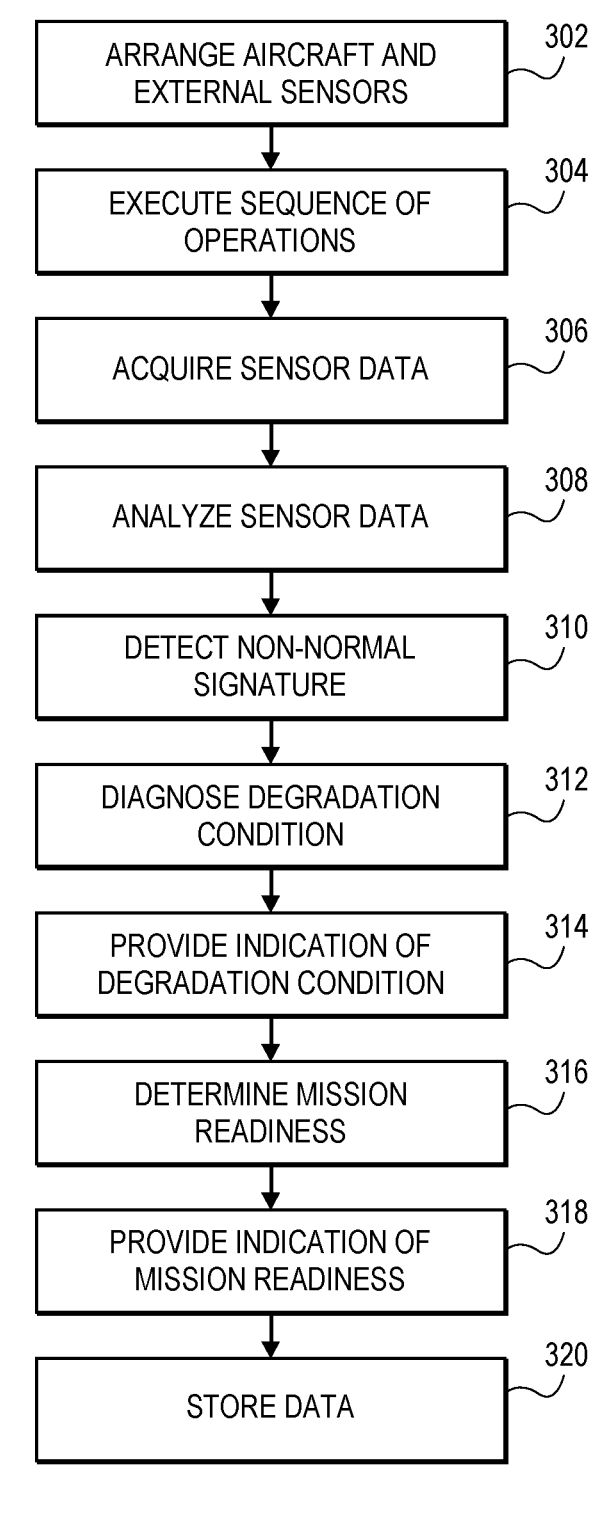
FIG. 3 is a flowchart for a method of assessing mission readiness of an uncrewed air transport platform according to various embodiments.

An example operation of the system 100 is shown and described in detail herein in reference to FIGS. 2 and 3. In particular, an example of arranging the aircraft 102 and the sensors 110 in proximity to each other is shown and described in reference to FIG. 2. An example of usage of the system 100 to assess mission readiness of an uncrewed air transport platform is shown and described herein in reference to FIG. 3.

FIG. 2 illustrates an example technique 200 for arranging an aircraft, such as an uncrewed air transport platform, and sensors in proximity to each other according to various embodiments. By way of non-limiting example, the technique 200 is described in reference to the elements of FIG. 1. A portion of an aircraft is shown in FIG. 2, including an engine 210, an exhaust nozzle 220, and a pylon 230. The aircraft may be an aircraft 102 as shown and described in reference to FIG. 1, and the technique 200 may be used to position the one or more sensors 110 of FIG. 1 in proximity to the aircraft.

The X's 212, 222, 232 may indicate locations at which contact sensors may be attached and/or stand-off sensors may be directed, e.g., at various specified times throughout the duration of a sequence of specified operations being performed by the aircraft. For example, the contact vibration sensor 115 or sensors may be attached to the aircraft at the locations of the X's 221, 222, 232, e.g., using respective suction cups. The contact vibration sensor 115 or sensors may be attached to the locations of the X's 221, 222, 232 simultaneously (e.g., for multiple sensors) or sequentially (e.g., for one sensor). As another example, the LiDAR sensor 113 or sensors and/or temperature sensor 116 or sensors may be directed to the locations of the X's 212, 222, 232. The timing of the attachments, and/or the direction, may be specified to a user through the user interface 122. Note that in general, the shape of the X's 212, 222, 232 is non-limiting; any shape or visual indicator may be used according to various embodiments.

According to some embodiments, the X's 212, 222, 232 may be permanently affixed to the aircraft. For example, the X's 212, 222, 232 may be part of the aircraft's livery.

According to some embodiments, the X's 212, 222, 232 may be virtually imposed on the view as shown in the display of the user interface 122. According to some embodiments, the view shown in FIG. 2 may be displayed on a screen, such as the user interface 122 of FIG. 1. The view of FIG. 2 may represent a field of view as acquired by the visual sensor 112 and/or the temperature sensor 116. The user interface may direct the user to capture various parts of the aircraft, or the entirety of the aircraft, in the field of view at appointed times, e.g., throughout the duration of a sequence of specified operations being performed by the aircraft. While the aircraft is displayed in the view, the system 100 may impose the X's 212, 222, 232 at the appropriate locations, e.g., at the times at which the sensors are to be attached and/or directed. Thus, the X's 212, 222, 232 may represent augmented reality fiducial marks according to some embodiments. According to some embodiments, the system 100 may use pattern recognition to determine the particular aircraft type from the image captured by the visual sensor. According to such embodiments, the system 100 may retrieve a template of where the X's 212, 222, 232 are to be imposed. Thus, the system 100 may automatically detect the aircraft type, determine where the fiducial marks are to be virtually presented, and present the fiducial marks in an augmented reality setting.

FIG. 3 is a flowchart for a method 300 of assessing mission readiness of an aircraft, such as an uncrewed air transport platform, according to various embodiments. The method 300 may be practiced using the system 100 of FIG. 1 and/or the technique 200 of FIG. 2. By way of non-limiting example, the method 300 is presented in reference to the elements of the system 100 of FIG. 1. The method 300, including each of its actions, may be performed while the aircraft remains on the ground, e.g., as part of a pre-flight readiness assessment or post-flight analysis.

At 302, the aircraft and at least one external sensor are arranged in proximity to each other. The external sensor may be any sensor as shown and described herein in reference to the sensors 110 of FIG. 1. Any, or a combination, of such sensors may be used. In general, the aircraft and the external sensor may be arranged in proximity to each other so that the external sensor may operatively acquire data from the aircraft. By way of non-limiting example, the aircraft and the external sensor may be arranged in proximity to each other using the technique 200 of FIG. 2.

At 304, a sequence of operations of the aircraft are executed. In general, the system 100 exercises engine and aircraft subsystems using sets of input commands that produce sensor data advantageous to creating health signatures and diagnosis of degradation conditions. The sequence of operations may be performed automatically, e.g., by invoking an internal diagnostic routine of the aircraft. Alternately, or in addition, the sequence of operations may be controlled by the user station 120. The sequence of operations may include operations that exercise any, or any combination, one or more engines, one or more electric motors (e.g., one or more electric propulsive motors), one or more actuators, one or more environmental controls, etc. For example, each motor may be exercised in isolation and the current from the motor power supply or supplies sensed to determine how much current is required for various motions. Further, each motor may be exercised in isolation, so that the vibration attributed to that motor can be isolated and analyzed, e.g., to produce an individual health signature. In general, any component may be exercised in isolation and sensed by one or more sensors.

At 306, sensor data of the aircraft are acquired from the at least one external sensor. The sensor data may be acquired by the user station 120, e.g., via wireless and/or wired connection. The sensor data may be acquired by the data receiver 132, for example.

At 308, the sensor data is automatically analyzed to detect at least one degradation condition of the aircraft. The analysis may include creating one or more health signatures, e.g., using the health signature creation system 134. The analysis may include assessing a created health signature, e.g., by comparing it to health signatures that are known to indicate degradation conditions. For example, the created health signature may be compared to the non-normal health signatures in the health signature database 138 using the assessment module 136.

At 310, a non-normal health signature is detected by the analysis of 308. The detection may arise due to a match between the created health signature and a health signature associated with a degradation condition, e.g., as stored in the health signature database 138. The detection may arise due to an assessment based on a threshold, a machine learning assessment (e.g., by a trained neural network), or by a different technique.

At 312, one or more degradation conditions in the aircraft are diagnosed based on the at least one non-normal health signature. The diagnosis may be accomplished by retrieving a diagnosis associated with the non-normal health signature detected at 310 from the health signature database 130, for example.

At 314, an indication of the one or more degradation conditions diagnosed at 312 are provided. The indication may be provided by display on the user interface 122 of the system 100, by way of non-limiting example.

At 316, a determination of mission readiness is made. The determination may be based on mission requirements and limitations imposed on the aircraft by the degradation conditions diagnosed at 312. For example, the degradation condition(s) may limit the aircraft from performing certain operations, such as performing certain maneuvers (e.g., due to an actuator fault), sustaining a human passenger (e.g., due to an environmental fault), or achieving flight (e.g., due to an engine or propulsion motor fault and/or due to a power unit fault). The limitations may be stored in association with the degradation condition(s) in the health signature database 130, for example, and the mission requirements may be provided through the user interface 122. Thus, the assessment system 136 may make the determination of mission readiness by comparing the provided mission requirements to the limitations due to the degradation condition(s).

At 318, an indication of mission readiness is provided. The indication may be provided by display on the user interface 122, for example. The indication may take the form of, e.g., affirmative or negative, or equivalents thereof.

At 320, the health signature is optionally stored in the health signature database 130. The actions of this block may include storing the health signature in the health signature database 130 in association with the degradation conditions diagnosis. Thus, the health signature database is augmented with the health signature, thereby broadening the scope of health signatures that it associates with the particular degradation condition(s). Accordingly, the method 300 improves over time, as more health signatures are added to the health signature database, particularly when the health signature database 130 is shared among implementations of the system 100 that are used throughout a fleet of aircraft.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of assessing an operational condition of an uncrewed air transport platform, the method comprising:

arranging the uncrewed air transport platform and at least one external sensor in proximity to each other, wherein the at least one external sensor comprises a vibration sensor;

directing the at least one external sensor to the uncrewed air transport platform to sense at an indicated location on the uncrewed air transport platform;

executing a sequence of operations of the uncrewed air transport platform;

acquiring sensor data of the uncrewed air transport platform from the at least one external sensor;

automatically analyzing the sensor data to detect at least one non-normal health signature of the uncrewed air transport platform;

automatically diagnosing one or more degradation condition in the uncrewed air transport platform based on the at least one non-normal health signature; and providing an indication of the one or more degradation condition.

2. The method of claim 1, wherein the vibration sensor comprises a stand-off vibration sensor.

3. The method of claim 1, wherein the uncrewed air transport platform comprises at least one internal sensor that is electrically unconnected to any uncrewed air transport platform system, the method further comprising acquiring internal sensor data from the internal sensor, wherein the sensor data comprises the internal sensor data.

4. The method of claim 3, wherein the acquiring the internal sensor data from the internal sensor comprises:

electrically connecting a wireless transceiver to the internal sensor; and wirelessly acquiring the internal sensor data.

5. The method of claim 1, wherein the indication of the degradation condition comprises an indication of a fault, the method further comprising remediating the fault based on the indication of the fault.

6. The method of claim 1, wherein the indication of the degradation condition comprises an indication of a potential future fault, the method further comprising performing conditional maintenance on the uncrewed air transport platform based on the indication of the potential future fault.

7. The method of claim 1, further comprising providing a fiducial marker of the indicated location on an image of the uncrewed air transport platform.

8. The method of claim 1, wherein the sequence of operations comprises an activation of an actuator, wherein the sensor data comprises actuator data of the actuator, and wherein the at least one non-normal health signature comprises an indication of a degradation condition of the actuator.

9. The method of claim 1, wherein the automatically analyzing the sensor data comprises providing the sensor data to a trained machine learning system.

10. A non-transitory computer readable medium comprising computer readable instructions that, when executed by an electronic processor, configure the electronic processor to assess an operational condition of an uncrewed air transport platform by performing actions comprising:

directing that at least one external sensor sense at an indicated location on the uncrewed air transport platform;

acquiring sensor data of the uncrewed air transport platform from the at least one external sensor, wherein the sensor data is obtained while executing a sequence of operations of the uncrewed air transport platform after arranging the uncrewed air transport platform and the at least one external sensor in proximity to each other, wherein the at least one external sensor comprises a vibration sensor;

automatically analyzing the sensor data to detect at least one non-normal health signature of the uncrewed air transport platform;

automatically diagnosing one or more degradation condition in the uncrewed air transport platform based on the at least one non-normal health signature; and providing an indication of the one or more degradation condition.

11. The computer readable medium of claim 10, wherein the vibration sensor comprises a stand-off vibration sensor.

12. The computer readable medium of claim 11, wherein the uncrewed air transport platform comprises at least one internal sensor that is electrically unconnected to any uncrewed air transport platform system, wherein the actions further comprise acquiring internal sensor data from the internal sensor, wherein the sensor data comprises the internal sensor data.

13. The computer readable medium of claim 10, wherein the indication of the degradation condition comprises an indication of a fault.

14. The computer readable medium of claim 10, wherein the indication of the degradation condition comprises an indication of a potential future fault.

15. The computer readable medium of claim 10, wherein the sequence of operations comprises an activation of an actuator, wherein the sensor data comprises actuator data of the actuator, and wherein the at least one non-normal health signature comprises an indication of a degradation condition of the actuator.

16. The computer readable medium of claim 10, wherein the automatically analyzing the sensor data comprises providing the sensor data to a trained machine learning system.

17. The non-transitory computer readable medium of claim 10, wherein the directing comprises providing a fiducial marker of the indicated location on an image of the uncrewed air transport platform.

18. A system for assessing an operational condition of an uncrewed air transport platform, the system comprising:

at least one external sensor configured to be arranged in proximity to the uncrewed air transport platform, wherein the at least one external sensor comprises a vibration sensor; and an electronic processor communicatively coupled to the at least one external sensor, the electronic processor configured to perform actions comprising:

directing that the at least one external sensor sense at an indicated location on the uncrewed air transport platform;

acquiring sensor data of the uncrewed air transport platform from the at least one external sensor while the uncrewed air transport platform executed a sequence of operations;

automatically analyzing the sensor data to detect at least one non-normal health signature of the uncrewed air transport platform;

automatically diagnosing one or more degradation condition in the uncrewed air transport platform based on the at least one non-normal health signature; and providing an indication of the one or more degradation condition.

19. The system of claim 18, wherein the vibration sensor comprises a stand-off vibration sensor.

20. The system, of claim 18, wherein the directing comprises providing a fiducial marker of the indicated location on an image of the uncrewed air transport platform.

\*   \*   \*   \*   \*